Sept. 21, 1937.  H. A. S. HOWARTH  2,093,521
RADIAL BEARING
Filed June 12, 1934  3 Sheets-Sheet 1
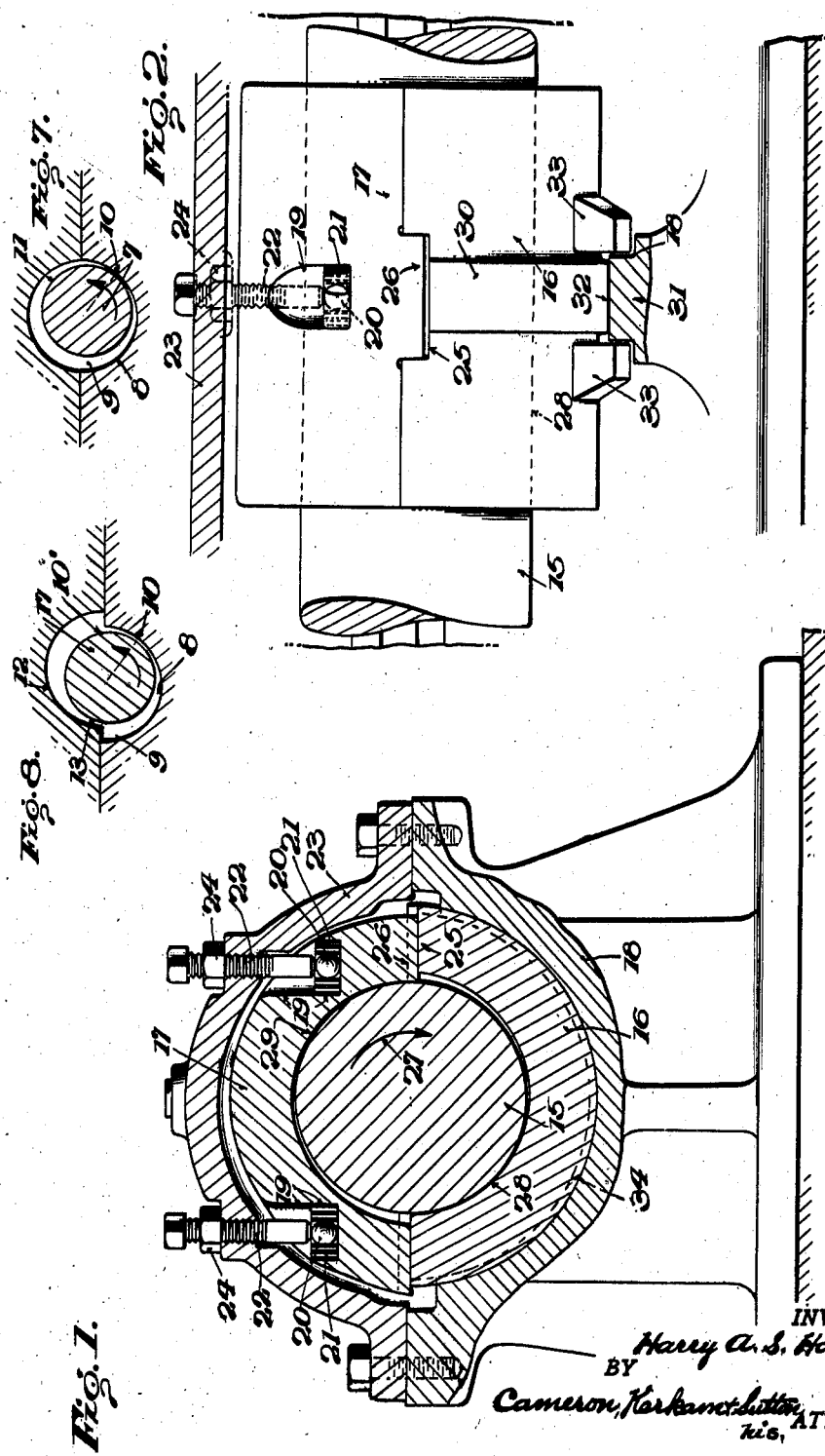
INVENTOR
Harry A. S. Howarth
BY
Cameron, Kerkam & Sutton
his ATTORNEYS Sept. 21, 1937.　　H. A. S. HOWARTH　　2,093,521
RADIAL BEARING
Filed June 12, 1934　　3 Sheets-Sheet 2

INVENTOR
Harry A. S. Howarth
BY
Cameron, Kerkam & Sutton
his ATTORNEYS

Sept. 21, 1937.　　　H. A. S. HOWARTH　　　2,093,521
RADIAL BEARING
Filed June 12, 1934　　　3 Sheets-Sheet 3

Inventor
Harry A. S. Howarth
By
Cameron, Kerkam + Sutton
his Attorneys

Patented Sept. 21, 1937

2,093,521

UNITED STATES PATENT OFFICE 2,093,521

RADIAL BEARING

Harry A. S. Howarth, Philadelphia, Pa., assignor to Kingsbury Machine Works, Inc., Philadelphia, Pa., a corporation of Delaware Application June 12, 1934, Serial No. 730,324

23 Claims. (Cl. 308—121)

This invention relates to radial bearings of the oil film type, and more particularly to bearings of this character which have bearing means at the loaded side of the shaft, i. e., that side of the bearing toward which the load is acting, holding the shaft firmly in its oil film even though the direction of the radial load may vary through a considerable angle.

When a shaft is rotating in bearing engagement with a stationary radial bearing surface in the presence of an adequate supply of lubricant the shaft tends to form an oil film between the bearing surfaces which is characterized by a decreasing thickness in the direction of shaft rotation and which may be described as wedge-shaped with the convergence of the wedge pointing in the direction in which the shaft is moving. In this oil film the pressure increases in the direction of convergence of the wedge with the total pressure in the oil film balancing the load on the shaft. The location of this wedge-shaped oil film is dependent on the location of the resultant of the load on the shaft, and the formation of the said wedge-shaped oil film causes the shaft to assume a position which is eccentric with respect to the circle defined by the stationary bearing surface.

This eccentric position of the shaft with respect to the circle of the stationary bearing surface also produces a wedge-shaped space pointing in the opposite direction from that in which the shaft is rotating and on the opposite or unloaded side of the shaft, but as this space is increasing in width in the direction of shaft rotation it tends to produce a relatively low pressure at the side of the shaft which is 180° removed from the high pressure region of the load sustaining oil film. This region of relatively low pressure affords an opportunity for the admission of air which is drawn into the oil film, causing aeration of the oil and thereby upsetting the normal pressure conditions existing in the load sustaining oil film. Partial vaporization of the oil of the film and turbulence of flow, particularly at high speed, may also arise. Hence the development of a relatively low pressure at the unloaded side of the shaft may cause a condition of unbalance which results in an undue shift of the shaft, and this condition of unbalance or the aeration, vaporization or turbulence of the oil in the film may cause the setting up of a vibration of the shaft.

Various proposals have heretofore been made with respect to the correction of these conditions, but so far as I am aware no such provision has proved entirely satisfactory.

It is an object of this invention to provide a radial bearing of the type characterized with means which will automatically set up a positive pressure on the unloaded side of the shaft and thereby avoid the difficulties arising from the conditions heretofore referred to, to the end that the displacement or vibration of the shaft may be automatically controlled.

Another object of this invention is to provide a radial bearing of the type characterized with a bearing element that cooperates with the rotating shaft to form automatically on the unloaded side of the shaft a wedge-shaped oil film that points in the same direction as the load sustaining oil film and produces a positive pressure on the shaft on the side thereof remote from the load sustaining oil film.

Another object of this invention is to provide a self-aligning bearing with improved means to prevent the bearing sections from getting out of proper alignment, and thereby avoiding oil splash due to the relative position assumed by said sections during the performance of the self-aligning function.

Other objects will appear as the description of the invention proceeds.

The invention is capable of receiving a variety of mechanical expressions, some of which are shown diagrammatically on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures, Fig. 1 is a diagrammatic transverse section of an embodiment of the present invention;

Fig. 2 is a diagrammatic elevation partly in section of another though similar embodiment, wherein the bearing is self-aligning;

Figs. 7 and 8 are schematic views for the purpose of explaining the principle involved.

Figure 3:
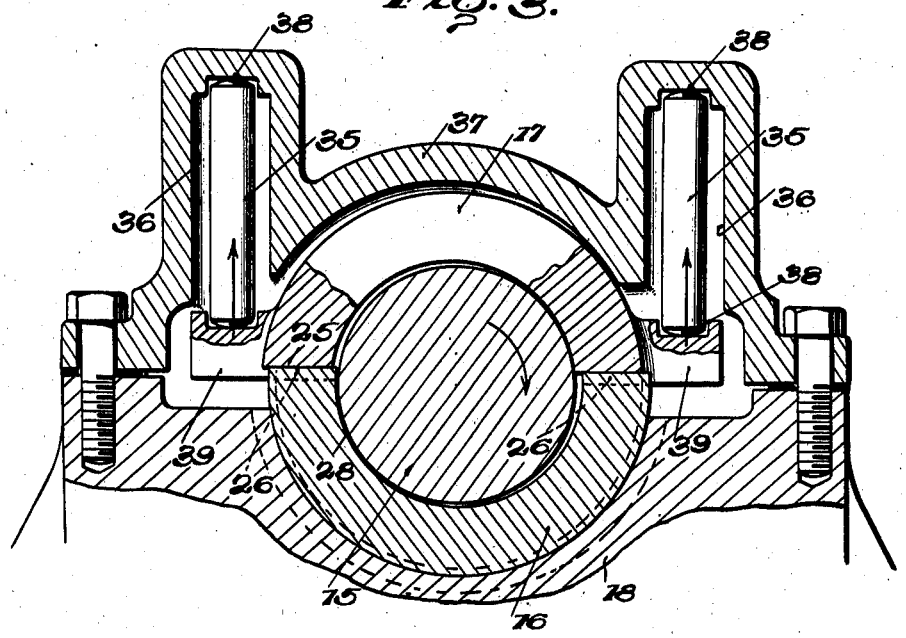
Fig. 3 is a diagrammatic transverse section of another embodiment of the present invention.
Figure 5:
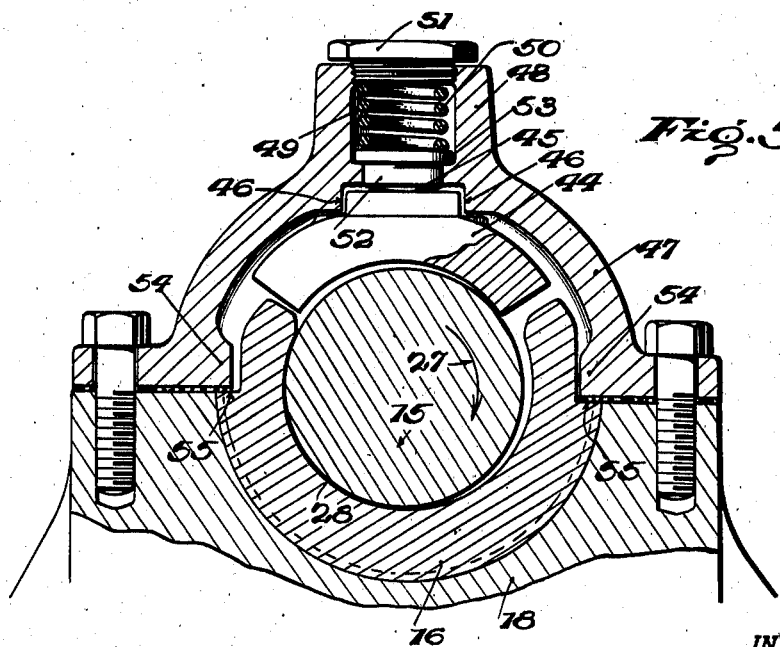
Fig. 5 is a diagrammatic transverse section of yet another embodiment of the present invention.

In all of the figures the clearance spaces between the relatively rotatable bearing surfaces have been greatly exaggerated so as to illustrate the wedge-shaped character thereof, but it is to be understood that in practice the variation in thickness of the oil film which assumes the wedge-shaped form, under well established hydrodynamic principles, is of a magnitude that can be determined only by precision measurements.

Referring first to Fig. 7, shaft 7 is assumed to be rotating in stationary bearing member 8 in the direction of the arrow, and when it rotates in the presence of an adequate supply of lubricant, said lubricant is drawn into the clearance space at 9 and a wedge-shaped oil film is set up with the tip of the wedge at 10 pointing in the direction of shaft rotation. The pressure in the film so formed increases from 9 to 10, and the total pressure generated in the film balances the load on the shaft, the circumferential location of the wedge being determined by the direction of the resultant of the pressure acting on the shaft. If the stationary bearing member 8 is concentric with the shaft 7 a wedge-shaped space 11 is also formed at the opposite side of the shaft into which the oil of the film is being carried by the rotation of the shaft. But this wedge-shaped space is increasing in thickness in the direction of rotation of the shaft, so that the pressure in the oil film decreases therein with a minimum pressure at approximately 180° from the location of the maximum pressure in the load sustaining oil film 9, 10.

Referring now to Fig. 8, if upper bearing member 12 is movable transversely of the shaft under the pressure developed at 10' in Fig. 7, said member will be moved automatically to the right as viewed in the drawings until a second wedge-shaped oil film 13 is formed when member 12 comes to rest under a balance of pressures, and this wedge-shaped film will be automatically determined by the particular speed of the shaft, the viscosity of the oil and the magnitude of the load, the position assumed tending to be that in which a maximum pressure is exerted downwardly on member 8. This second film would ordinarily not be a counterpart of the load sustaining film. Thereby a positive pressure is applied to the shaft at a location which is opposite the location of the load sustaining film, whereby the tendency of the shaft to change its position in its seat, i. e., to vary its lift or eccentricity, or to set up a vibration, will be largely if not entirely offset. At the same time the tendency to draw air into the film owing to the low pressure at the widest point of the clearance in Fig. 7 will also be largely if not entirely overcome.

To effect the desired result the shaft must be so supported that it is possessed of the necessary stability and be firmly held in its oil film by the radial load even though said load varies through a considerable angle. Preferably the bearing member at the loaded side of the shaft, and which may embrace as much as 270° of the radial bearing surface, is rigidly supported against pivotal or flexible movement in the direction of the circumference of the shaft and preferably takes the form of a single bearing shell section of proper arc. Even where the radial load does not vary a non-pivotal shell has distinct advantage, except perhaps for very narrow bearings, in this matter of stability. Hence the present invention is to be sharply differentiated from known radial bearings using circumferentially tiltable shoes at the loaded side of the shaft.

The present invention in its broader aspect therefore involves a radial bearing having a bearing member at the loaded side of the shaft which holds the shaft firmly in its oil film even though the direction of the radial load may vary through a considerable angle and which is provided with means to form automatically a suitable wedge-shaped oil film at the unloaded side of the shaft that generates the desired positive pressure to control the tendency of the shaft to rise or vibrate. To this end a bearing member for cooperation with the unloaded side of the shaft is supported in any suitable way so that it will automatically assume such a position with respect to the radial bearing surface of the shaft that the desired wedge-shaped oil film is formed at said unloaded side. The invention may be used with equal facility with self-aligning as well as non-aligning bearings, as hereinafter explained.

Some forms in which the present invention may be embodied are illustrated in Figs. 1 to 6, but as will be apparent to those skilled in the art the invention may take a variety of other forms, those illustrated being selected merely for purposes of exemplifying the principle of the present invention and the structure being shown diagrammatically inasmuch as the invention may be applied to radial bearings of any suitable construction, size, character and service.

Figure 4:
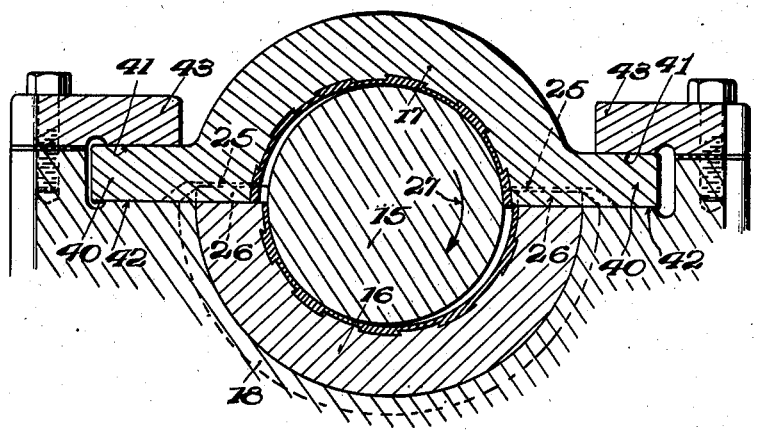
Fig. 4 is a diagrammatic transverse section of yet another embodiment of the present invention.

Referring first to the embodiments of Figs. 1 and 2, the shaft 15 is shown as provided with radial bearing members 16 and 17, each of substantially 180° in extent, although obviously this is not essential as the bearing member at the loaded side of the shaft may embrace as much as 270° of the shaft, as shown for example in Fig. 4. Stationary bearing member 16 is fixed in any suitable way in a housing 18 which may be self-aligning if preferred, as hereinafter described more particularly. Bearing member 17 is mounted so that it may move transversely of the shaft under the pressures generated in the oil film. As here shown, bearing member 17 is provided in its opposite sides, in approximately the medial plane of said member, with a pair of recesses, as shown at 19, and mounted in each of said recesses is a ball 20, preferably centered therein by a coil spring 21 or other suitable elastic means. Each of said balls has bearing engagement with the end of a bolt 22 passing through a suitably threaded aperture in the bearing cap 23 and held in adjusted position by a lock nut 24. Said bearing cap may be attached to the housing in any suitable way as by bolts as shown. In order to prevent movement of the member 17 angularly with respect to the axis of the shaft, the stationary member 16 may be slotted on each side of the shaft as shown at 25 and the bearing member 17 may be provided with tongues or projections 26 engaging in said grooves 25 and having a slidable fit therewith, so that member 17 may move in the direction defined by said slots but is prevented from moving other than at right angles with respect to the shaft axis.

With the shaft rotating in the direction of the arrow 27 and assuming that the direction of load is downward toward the left, a wedge-shaped film 28 will be formed with the wedge converging in the direction of shaft rotation. The oil carried around by the shaft into cooperation with the bearing member 17 will exert pressure on the member 17 and move it to the left as viewed in Fig. 1, setting up a second wedge-shaped film 29 which is relatively opposite to said film 28, but not ordinarily a counterpart thereof, and which points in the same direction as the film 28. The balls 20 provide an anti-friction bearing whereby the member 17 may respond to the pressure in the oil film and take up its proper position with respect to the shaft. Thereby a film is formed on the unloaded side of the shaft to develop a positive pressure thereon and restrain the shaft against movement under fluctuations occurring in the load sustaining film, as by aeration, vaporization or turbulence of the oil, vibration of the shaft under unbalanced forces, etc.

The embodiment of Fig. 2 illustrates a construction similar to that described in conjunction with the embodiment of Fig. 1 but incorporated in a self-aligning bearing. As here shown the stationary bearing member 16 is provided with a circumferentially directed rib 30 which is seated on an axially narrow circumferentially directed seat 31. The surfaces of contact at 32 may be suitably curved in the direction of the axis or they may be cylindrical in shape where as shown they are narrow in the direction of the axis. Lugs 33 on the member 16 loosely embrace the seat 31 so as to provide clearance for freedom of relative movement. Said lugs 32 are relatively short in a circumferential direction and retain the member 16 against improper axial displacement while permitting a sufficient angular movement of said member with respect to the seat 31 in all directions so as to provide the self-aligning function. If the bearing is not to be self-aligning the rib 30 or a corresponding rib on the seat 31 may fit a circumferential groove in the opposed member as indicated in dotted lines at 34 in Fig. 1. The upper bearing member 17 may also be provided with like means if preferred to enable self-aligning movement thereof, as referred to hereinafter in conjunction with Fig. 6.

In the absence of means between the upper and lower bearing members to prevent relative axial movement, the movement of said members in aligning the bearing might result in said members being displaced axially with a consequent opportunity for oil to splash out of said members. The guide between said members provided at 25, 26, however, prevents relative axial displacement thereof, maintaining the end surfaces of said members flush or in their designed radial relationship and thus preventing splashing of the oil. The means provided for permitting transverse relative movement of the bearing members to enable the setting up of the positive pressure on the unloaded side of the bearing must not interfere with the self-aligning function when provided, while relative axial displacement of said bearing members should at the same time be prevented as just pointed out. Hence, in the embodiment of Fig. 2, the bearing member 17 is mounted for transverse movement on the balls 20 in its transverse medial plane whereby the positive pressure may be set up on the unloaded side of the bearing without interfering with the self-aligning action on seat 31, while at the same time relative axial displacement of said bearing members during either transverse or self-aligning movement is prevented by the tongue and groove guide at 25 and 26.

Another embodiment of the invention is illustrated in Fig. 3 wherein the bearing member 17 is mounted on the shaft 15 by means of a pair of parallel links or struts 35 seated in recesses 36 of a member 37 which may be a bracket or housing cap depending upon whether the member 17 is the bearing cap or the upper member of a radial bearing sleeve. The struts or rods 35 are provided with knife edge or transversely curved rocker surfaces 38 at each end thereof, and engage in recesses in lateral extensions 39 on the member 17 at their inner ends and in the bottoms of the main recesses 36 at their outer ends. Thereby said parallel and pivotally mounted struts 35, together with the bracket or casing 37 and the member 17, constitute a parallelogram whereby the member 17 may move at right angles to the axis of the shaft 15 but not angularly with respect to the shaft. One or more pairs of struts 35 may be used, depending upon the length of the radial bearing, the inclusion of self-aligning action, etc., and to prevent other than movement in a plane at right angles to the axis of the shaft, member 17 may also have projections 26 which engage in slots 25 in the relatively stationary member 16 as heretofore described. The embodiment of Fig. 3 will operate in the same manner as heretofore explained in conjunction with the embodiments of Figs. 1 and 2.

In the embodiment of Fig. 4 the bearing member 17 has radial extensions 40 which may slide in the slots provided at 41 between ledges 42 on the housing 18 and overhanging cap plates 43 suitably bolted to said housing. As in Figs. 1 to 3, angular movement of member 17 with respect to member 16 is prevented by a tongue and groove guide at 25, 26.

In place of providing a cap or bearing shell portion that may move transversely as heretofore disclosed, a tiltably mounted radial bearing member may be disposed at the unloaded side of the shaft and be provided with a bearing surface of any suitable arcuate extent, depending somewhat upon the character and service of the bearing involved. Referring to the embodiment of Fig. 5, a bearing shoe 44 is mounted on a rocker face 45 to tilt in the direction of the circumference of the shaft but is prevented from rotation in any suitable way as by shoulders 46 cooperating with a projection on the rear of said shoe. Any suitable means may be provided for mounting said shoe but resilient means are preferably provided for pressing the shoe into cooperative relationship with the surface of the shaft with a predetermined pressure. As here shown, the bearing cap 47 is provided with an extension 48 forming a recess 49 in which is disposed a coil spring 50 which may be adjusted by a threaded block or cap 51. Spring 50 at its inner end bears against a block 52 provided with a flange 53 which may engage the bottom of the recess 49 and prevent the block 52 from being forced from said recess when bearing cap 47 is removed. The inner face of block 52 cooperates with the rear face of the shoe 44 to provide a rocking surface therefor or to provide a surface on which said shoe may rock. Said shoe 44 is shown as disposed symmetrically with respect to the vertical plane of the bearing but it is to be expressly understood that the support of the shoe may be varied in location as necessary in order that the shoe may be mounted at that location which gives the best results for the particular conditions encountered. The direction of the resultant pressure generated by the shoe or other member on the unloaded side of the bearing depends on the manner and location of its support. Thus in Fig. 3 the resultant pressure will be parallel to the pins 35, while in Fig. 5 the resultant pressure will act through the pivot provided by surface 45 and be normal to the coacting pivot surfaces. Thus the line of reaction of the resultant forces exerted by the shoe can be located at will, by shifting the point of support of said shoe, to obtain the desired counterbalancing effect, and a similar result can be obtained by suitably locating the support of the member on the unloaded side of the shaft in the other embodiments.

The shaft, for example, may tend to vibrate at an angle to the resultant of the load so that in a simple case the shaft center tends to move in an ellipse which would tend to have its major axis at right angles to the resultant of the load. In such event it is desirable to so place the point of support of the shoe that its resultant pressure acts along the line of the major axis of such ellipse to reduce the amplitude of this vibration. If vibration in a different direction, or along the minor axis in the simple case assumed, is also important, another shoe may be so disposed as to counteract it, this second shoe possibly being of a different size than that counteracting the principal vibration. A plurality of pivoted shoes may also be used on the unloaded side of the shaft to provide positive pressures in different directions to counteract lift or vibration of the shaft under different conditions or directions of the operating load on the shaft; thus one shoe may apply positive pressure to counteract a tendency to lift or vibrate when the operating load is in one direction and a second shoe may be provided to perform a like function when the load is in another direction. In any event the shoe or shoes tilt in response to pressures set up in the oil film carried around by the shaft to the unloaded side thereof and establish a wedge-shaped oil film at the unloaded side so as to maintain a positive pressure on the side of the shaft which is opposite the load sustaining film.

While the shoe has been shown as extending over an arc of about 90°, this may be increased or decreased as required to obtain the best results. The bearing member 16 on the loaded side of the bearing in this embodiment extends for about 270° around the shaft and is prevented from rotation in any suitable way as by the engagement of lugs 54 on the cap 47 with shoulders 55 provided on said member 16. Where the bearing member 16 extends over 180° it may be made in sections suitably bolted together or it may be made integral and slipped over the end of the shaft. As shown the shoe 44 substantially fills the space between the ends of member 16 but this is not essential, particularly where the shoe is prevented from rotary movement by means as shown.

Figure 6:
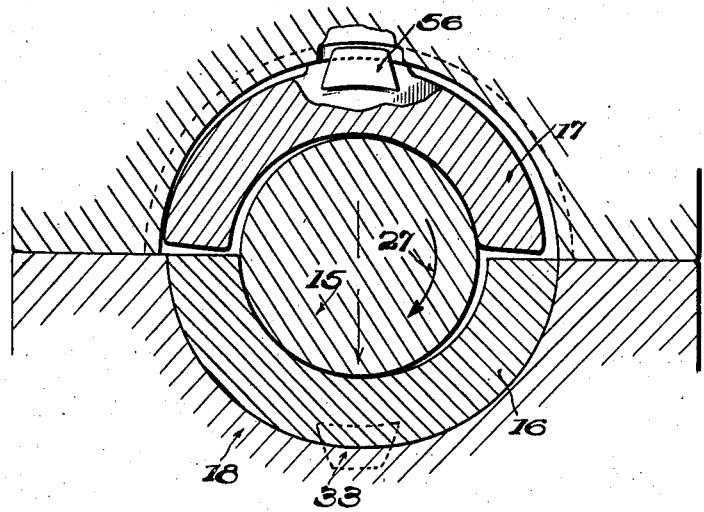
Fig. 6 is a diagrammatic transverse section of yet another embodiment of the present invention.

Fig. 6 illustrates a further embodiment wherein the bearing members 16 and 17 are guided to prevent relative movement out of proper axial alignment by guide lugs 56, cooperating with the sides of member 17, in place of the tongue and groove guiding means 25, 26. In place of the member 17 being constructed to move transversely of the shaft axis as in Figs. 1 to 4, said member, when the bore of the housing cap is cylindrical, may be cut away except at its point of reaction with said cover, as indicated in Fig. 6, so that said member may tilt on the cover and operate as in the embodiment of Fig. 5. The bearing of Fig. 6 may be made self-aligning, the member 16 being shown as mounted in the manner heretofore described in conjunction with the embodiment of Fig. 2, and as heretofore referred to the member 17 may be similarly constructed and have separate self-aligning movement by using lugs at 56 functioning as explained with respect to Fig. 2.

It will therefore be perceived that by the present invention means have been provided whereby the oil film of the bearing is so controlled that it has no tendency to amplify vibrations arising from extraneous causes and it is not itself a source or cause of vibration. To this end a positive pressure is automatically developed on the unloaded side of a radial bearing by the development of a wedge-shaped oil film by means of the oil carried around by the shaft in its rotation, said film being generated automatically and exerting a positive pressure on the relatively unloaded side of the shaft with a magnitude determined by the speed of the shaft, the viscosity of the oil and the load applied. Thereby the difficulties which have heretofore been experienced because of the presence of a negative pressure on the unloaded side of the shaft producing aeration of the oil film, undesired movements and vibration of the shaft, etc., are largely if not entirely overcome, while the positive pressure applied to the unloaded side of the shaft may be so located as to counteract extraneous vibrations. As the stationary member of the bearing is fixed to a relatively heavy frame in good heat conducting relation thereto, the heat generated by friction may be readily abstracted from the oil through said stationary member. Thereby a proper film may be maintained and the shaft assume a good running position which is relatively invariable.

While the direction of radial load indicated for the embodiments illustrated is downward, it is apparent that the construction may be inverted or reversed if the radial load is directed upwardly. The present invention also provides for the combination of the self-aligning function with the provision for developing a positive pressure at the unloaded side of the bearing, and at the same time means have been provided whereby improper axial displacement of the bearing parts has been prevented and splashing avoided under the self-aligning movement of the bearing parts.

The present invention may be readily incorporated in a wide variety of radial bearings, without in any way interfering with their normal construction, operation, etc., and the provision for thus setting up a positive pressure at the relatively unloaded side of the bearing is at the same time strong and rugged in character and effects its purpose without the introduction of undue complexity into the construction.

While several embodiments of the present invention have been illustrated and described with considerable particularity, it is to be expressly understood that the invention is not to be restricted thereto, as numerous other embodiments of the invention will now suggest themselves to those skilled in the art, while the present invention may be embodied in bearings of other types and constructions than those conventionally indicated by the accompanying drawings. Reference is therefore to be had to the appended claims for a definition of said invention.

What is claimed is:

1. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, means occupying substantially the entire arc of said rotatable bearing surface unoccupied by said stationary bearing shell section and movable in response to pressure of the oil to develop automatically a single wedge-shaped oil film at the unloaded side of said shaft to apply a positive pressure to the shaft at the unloaded side thereof.

2. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a bearing member cooperating with substantially the entire circumferential extent of said rotatable bearing surface at the unloaded side of said shaft which is unoccupied by said stationary bearing shell section and automatically movable to form a wedge-shaped oil film between the relatively rotatable bearing surfaces thereof with the wedge of said film pointing in the same direction circumferentially of the shaft as that of the load sustaining film.

3. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a radial bearing shell section cooperating with said shaft at the unloaded side thereof and slidable transversely of the shaft in response to the pressure of the lubricant carried around by the rotation of said shaft to form an oil film exerting a positive pressure on the shaft at the unloaded side thereof.

4. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a radial bearing shell section cooperating with said shaft at the unloaded side thereof and slidable transversely of the shaft in response to the pressure of the lubricant carried around by the rotation of said shaft to form an oil film exerting a positive pressure on the shaft at the unloaded side thereof, and means for restraining the movement of said bearing shell section to one at right angles to the axis of the shaft.

5. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a radial bearing shell section cooperating with said shaft at the unloaded side thereof and rectilinearly movable transversely of the shaft, and an anti-friction bearing for mounting said shell section whereby it may respond automatically to the pressure in the lubricant carried around by the rotation of said shaft.

6. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a radial bearing shell section cooperating with said shaft at the unloaded side thereof and rectilinearly movable transversely of the shaft, means for mounting said shell section whereby it may respond automatically to the pressure in the lubricant carried around by the rotation of said shaft, and cooperating means on said stationary bearing member and shell section for preventing relative movement of said shell section except at right angles to the axis of the shaft.

7. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a radial bearing shell section cooperating with said shaft at the unloaded side thereof and rectilinearly movable transversely of the shaft, and parallel tiltable members for mounting said shell section whereby said shell section may move at right angles to the axis of the shaft in response to the pressure in the lubricant carried around by the rotation of the shaft.

8. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a radial bearing shell section cooperating with said shaft at the unloaded side thereof and rectilinearly movable transversely of the shaft, and means for mounting said shell section whereby said shell section may move at right angles to the axis of the shaft in response to the pressure in the lubricant and is guided in its relative movement at right angles to the axis of the shaft.

9. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a radial bearing member cooperating with at least 90° of the surface of said shaft at the unloaded side thereof, and means for tiltably mounting said member whereby the same may tilt to establish a wedge-shaped oil film at the unloaded side of said shaft.

10. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a single radial bearing member having a bearing surface for cooperation with said rotatable bearing surface at the unloaded side of the shaft, and means for mounting said member whereby said member may shift bodily transversely to said shaft and establish a wedge-shaped oil film developing a positive pressure at the unloaded side of said shaft.

11. In a radial bearing of the type which does not employ a plurality of tiltable bearing shoes at the loaded side of the shaft, in combination with a shaft and a stationary bearing shell section cooperating with a rotatable bearing surface on said shaft to form a wedge-shaped oil film between the relatively rotatable bearing surfaces and to hold said shaft firmly in its film at the loaded side of said shaft, a single bearing shoe at the unloaded side of said bearing and provided with a bearing surface cooperating with said rotatable bearing surface throughout substantially the circumferential extent thereof unoccupied by said stationary bearing shell section, and means for mounting said bearing shoe whereby said shoe will tilt and form a wedge-shaped oil film to apply a positive pressure to the side of the shaft which is substantially opposite the load sustaining film.

12. In a radial bearing of the type which does not employ a plurality of tiltable bearing shoes at the loaded side of the shaft, in combination with a shaft and stationary bearing means cooperating with a rotatable bearing surface on said shaft to form a wedge-shaped oil film between the relatively rotatable bearing surfaces and to hold said shaft firmly in its film at the loaded side of said shaft, a single bearing member movably mounted at the unloaded side of said shaft and provided with a bearing surface cooperating with said rotatable bearing surface substantially throughout the circumferential extent thereof unoccupied by said bearing means at the loaded side of the shaft, and means for mounting said bearing member whereby said member will move automatically and form a wedge-shaped oil film that applies a positive pressure to the unloaded side of said shaft with the resultant of the pressure generated by said film at the unloaded side of the shaft exerted in a predetermined direction with respect to the tendency of said shaft to rise in its bearing when rotating under load.

13. In a radial bearing of the type which does not employ a plurality of tiltable bearing shoes at the loaded side of the shaft, in combination with a shaft and stationary bearing means cooperating with a rotatable bearing surface on said shaft to form a wedge-shaped oil film between the relatively rotatable bearing surfaces and to hold said shaft firmly in its film at the loaded side of said shaft, a single bearing member movably mounted at the unloaded side of said shaft and provided with a bearing surface cooperating with said rotatable bearing surface substantially throughout the circumferential extent thereof unoccupied by said bearing means at the loaded side of the shaft, and means for mounting said bearing member whereby said bearing member will move automatically and form a wedge-shaped oil film at the unloaded side of said shaft, said mounting means being so disposed that the resultant of the pressure created by said film at the unloaded side of said shaft will lie in a direction tending to counteract vibratory motion of said shaft when rotating under load.

14. In a radial bearing of the type which does not employ a plurality of tiltable bearing shoes at the loaded side of the shaft, in combination with a shaft and stationary bearing means cooperating with a rotatable bearing surface on said shaft to form a wedge-shaped oil film between the relatively rotatable bearing surfaces and to hold said shaft firmly in its film at the loaded side of said shaft, a single bearing member at the unloaded side of said bearing and provided with a bearing surface for cooperation with said rotatable bearing surface throughout substantially the entire arc of said rotatable surface unoccupied by said bearing means at the loaded side of the shaft, and means for mounting said bearing member whereby it will slide transversely in response to oil pressure and form a wedge-shaped oil film that applies a positive pressure to the unloaded side of the shaft in a direction bearing a predetermined relationship to the direction of load on said shaft.

15. In a radial bearing of the type which does not employ a plurality of tiltable bearing shoes at the loaded side of the shaft, in combination with a shaft and stationary bearing means cooperating with a rotatable bearing surface on said shaft to form a wedge-shaped oil film between the relatively rotatable bearing surfaces and to hold said shaft firmly in its film at the loaded side of said shaft, a single bearing member at the unloaded side of said bearing complementary in circumferential extent to the bearing means at the loaded side of the shaft and provided with a bearing surface for cooperation with said rotatable bearing surface, and means for mounting said bearing member whereby it will slide transversely in response to oil pressure and form a wedge-shaped oil film that applies a positive pressure to the unloaded side of the shaft in a direction tending to counteract vibratory motions of said shaft when rotating under load.

16. In a radial bearing of the type which does not employ a plurality of tiltable bearing shoes at the loaded side of the shaft, in combination with a shaft and a stationary bearing member cooperating with a rotatable bearing surface on said shaft to form a wedge-shaped oil film between the relatively rotatable bearing surfaces and to hold said shaft firmly in its film at the loaded side of said shaft, a radial bearing member having a bearing surface for cooperation with said rotatable bearing surface at the unloaded side of the shaft, means for mounting said member whereby said member may move transversely to said shaft and establish a wedge-shaped oil film developing a positive pressure at the unloaded side of said shaft, and means mounting said radial bearing whereby it is self-aligning, said means for mounting said member for transverse movement being radially aligned with said means for mounting said bearing for self-aligning movement.

17. In a radial bearing of the type which does not employ a plurality of tiltable bearing shoes at the loaded side of the shaft, in combination with a shaft and a stationary bearing member cooperating with a rotatable bearing surface on said shaft to form a wedge-shaped oil film between the relatively rotatable bearing surfaces and to hold said shaft firmly in its film at the loaded side of said shaft, a radial bearing member having a bearing surface for cooperation with said rotatable bearing surface at the unloaded side of the shaft, means for mounting said member whereby said member may move transversely to said shaft and establish a wedge-shaped oil film developing a positive pressure at the unloaded side of said shaft, means mounting said radial bearing whereby it is self-aligning, and means cooperating with said transversely movable bearing member to maintain said bearing members in radial alignment during self-aligning movement of said bearing members.

18. In a radial bearing of the type which does not employ a plurality of tiltable bearing shoes at the loaded side of the shaft, in combination with a shaft and a stationary bearing member cooperating with a rotatable bearing surface on said shaft to form a wedge-shaped oil film between the relatively rotatable bearing surfaces and to hold said shaft firmly in its film at the loaded side of said shaft, a radial bearing member having a bearing surface for cooperation with said rotatable bearing surface at the unloaded side of the shaft, means for mounting said member whereby said member may move transversely to said shaft and establish a wedge-shaped oil film developing a positive pressure at the unloaded side of said shaft, and means mounting said radial bearing whereby it is self-aligning, said means for permitting relative transverse movement cooperating with said bearing members to prevent relative axial displacement thereof whereby the ends of said bearing members are maintained in predetermined radial relationship during self-aligning movement of said bearing members.

19. In a radial bearing of the type which does not employ a plurality of tiltable bearing shoes at the loaded side of the shaft, in combination with a shaft, bearing shell sections cooperating with said shaft and relatively movable transversely of the axis of the shaft, means mounting said bearing shell sections whereby said bearing is self-aligning, and means cooperating with said bearing shell sections whereby said bearing shell sections are maintained in radial alignment during self-aligning movement of said bearing.

20. In a radial bearing of the type which does not employ a plurality of tiltable bearing shoes at the loaded side of the shaft, in combination with a shaft, bearing shell sections cooperating with said shaft and relatively movable transversely of the axis of the shaft, means for mounting said bearing shell sections whereby said bearing is self-aligning, and means for restraining relative movement between said bearing shell sections to a movement at right angles to the axis of the shaft whereby the ends of said bearing shell sections are retained in predetermined radial relationship during the self-aligning movement of said bearing members.

21. Means for controlling the position or vibration of a shaft mounted in a radial bearing shell of the type which does not employ a plurality of tiltable bearing shoes at the loaded side of the shaft but which forms a wedge-shaped oil film between the relatively rotatable surfaces of said shaft and bearing, including means moved by the oil carried by the shaft for generating a wedge-shaped oil film to create a positive pressure on said shaft at the unloaded side thereof and in a direction to counteract a tendency of said shaft to move when rotating under load.

22. Means for controlling the position or vibration of a shaft mounted in a radial bearing shell of the type which does not employ a plurality of tiltable bearing shoes at the loaded side of the shaft but which forms a wedge-shaped oil film between the relatively rotatable surfaces of said shaft and bearing, including means moved by the oil carried by the shaft for forming a wedge-shaped oil film at the unloaded side of the shaft with the wedge pointing in the same direction circumferentially as that of said load sustaining film and with the resultant pressure of said film at the unloaded side of the shaft acting in a direction to control a tendency of the shaft to move transversely of its axis when rotating under load.

23. Means for controlling the position or vibration of a shaft mounted in a radial bearing shell of the type which does not employ a plurality of tiltable bearing shoes at the loaded side of the shaft but which forms a wedge-shaped oil film between the relatively rotatable surfaces of said shaft and bearing, said means including, in combination with the stationary bearing member, means relatively above the shaft on the opposite side of said shaft from said stationary bearing member and moved by the oil carried by the shaft for automatically developing by the pressure in the lubricant carried around by said shaft a wedge-shaped oil film whose resultant of pressure is a positive pressure which acts on the unloaded side of the shaft in a predetermined direction with respect to the direction of the load on the shaft to substantially counteract the pressure on said shaft tending to lift or vibrate the same.

HARRY A. S. HOWARTH.